(12) United States Patent
Takizawa et al.

(10) Patent No.: US 10,352,427 B2
(45) Date of Patent: Jul. 16, 2019

(54) CUP-SHAPED FLEXIBLE EXTERNALLY TOOTHED GEAR AND CUP-TYPE STRAIN WAVE GEARING

(71) Applicant: Harmonic Drive Systems Inc., Shinagawa-ku, Tokyo (JP)

(72) Inventors: Noboru Takizawa, Azumino (JP); Go Kuroiwa, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 270 days.

(21) Appl. No.: 15/408,889

(22) Filed: Jan. 18, 2017

(65) Prior Publication Data
US 2017/0227106 A1 Aug. 10, 2017

(30) Foreign Application Priority Data
Feb. 8, 2016 (JP) .................................. 2016-021912

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC .......................... F16H 49/001; F16H 2049/003
USPC ......................................................... 74/640
See application file for complete search history.

(56) References Cited

U.S. PATENT DOCUMENTS

| | | | | | |
|---|---|---|---|---|---|
| 5,269,202 | A | * | 12/1993 | Kiyosawa | F16H 49/001 74/640 |
| 5,715,732 | A | * | 2/1998 | Takizawa | F16H 49/001 475/180 |
| 6,050,155 | A | * | 4/2000 | Tortora | F16H 49/001 74/640 |
| 6,202,508 | B1 | * | 3/2001 | Takizawa | F16H 49/001 74/411 |
| 7,249,536 | B2 | * | 7/2007 | Kiyosawa | F16H 49/001 74/640 |
| 8,302,507 | B2 | * | 11/2012 | Kanai | F16H 55/0833 29/893.35 |

FOREIGN PATENT DOCUMENTS

JP 61-173851 U 10/1986
WO WO 2013/024511 A1 2/2013

* cited by examiner

*Primary Examiner* — Ha Dinh Ho
(74) *Attorney, Agent, or Firm* — Buchanan Ingersoll & Rooney PC

(57) ABSTRACT

In the cup-shaped externally toothed gear, the outside end face profile of the diaphragm is defined by a first concave circular arc having a first radius, a second concave circular arc that has a second radius and is smoothly connected to the first concave circular arc, an inclined straight line that is smoothly connected to the second concave circular arc and is inclined toward an inside straight line with respect to the center axis line, the inside straight line defining the outside profile of the diaphragm. The second radius is larger than the first radius, and the thickness of the diaphragm is gradually decreased from the side of the boss to the side of the cylindrical body. The stress concentration in the boss-side joint portion of the diaphragm can be relieved, whereby enhancing fatigue strength of the flexible externally toothed gear.

5 Claims, 5 Drawing Sheets

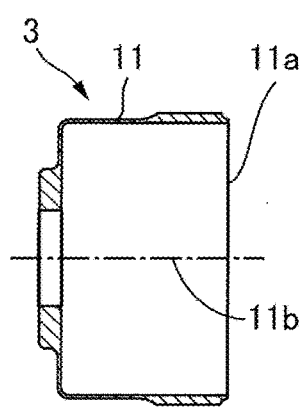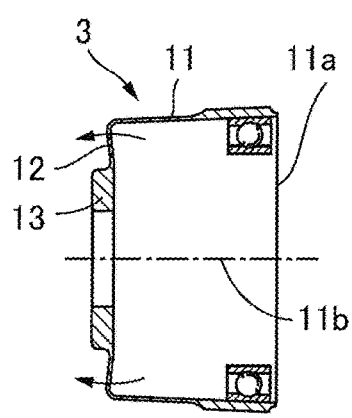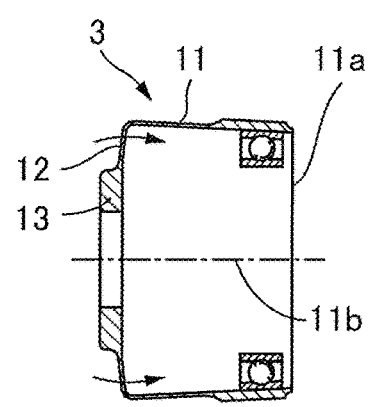

CUP-SHAPED FLEXIBLE EXTERNALLY TOOTHED GEAR AND CUP-TYPE STRAIN WAVE GEARING

BACKGROUND OF THE INVENTION

Field of the Invention

The present invention relates to cup-type strain wave gearings, and in particular, relates to a small-size, cup-shaped flexible externally toothed gear for a cup-type strain wave gearing.

Description of the Related Art

FIG. 1A is a longitudinal cross sectional view showing a typical cup-type strain wave gearing, and FIG. 1B is a schematic diagram thereof when cut along a plane perpendicular to a center axis line of the device. As shown in these drawings, the strain wave gearing 1 has an annular rigid internally toothed gear 2, a cup-shaped flexible externally toothed gear 3 arranged inside the rigid internally toothed gear in a concentric manner, and an ellipsoidal-contoured wave generator 4 fitted inside the flexible externally toothed gear 3. The flexible externally toothed gear 3 has a flexible cylindrical body 11, a diaphragm 12 extending radially inward from one end of the cylindrical body in the direction of the center axis line 1a, and a rigid boss 13 continued to the inner peripheral edge of the diaphragm 12.

A portion of the cylindrical body 11 of the flexible externally toothed gear 3 where external teeth 14 are formed is flexed by the wave generator 4 into an ellipsoidal shape, whereby the external teeth 14 located on both ends in the major-axis direction of the ellipsoidal shape are meshed with internal teeth 15 of the rigid internally toothed gear 2. Since the difference in number of teeth between the both gears 2 and 3 is 2n (n is a positive integer), the meshing positions between the both gears 2 and 3 move circumferentially to generate relative rotation between the gears according to the difference in number of teeth when the wave generator 4 is rotated by a motor or another rotational source. Typically, the rigid internally toothed gear 2 is fixed so as not to rotate, and a greatly reduced-speed rotation is output from the flexible externally toothed gear 3.

FIGS. 2A, 2B and 2C are explanatory views showing longitudinal cross sections of the cup-shaped flexible externally toothed gear 3 before and after it is deformed. The cylindrical body 11 of the flexible externally toothed gear 3 has an original cylindrical shape before it is deformed as shown in FIG. 2A. After being deformed into an ellipsoidal shape by the wave generator 4, the cylindrical body 11 becomes a state in which the longitudinal cross sectional shape thereof including the major axis of the ellipsoidal shape is tapered outward from the side of the diaphragm 12 toward the open end 11a, as shown in FIG. 2B. Whereas, the longitudinal cross sectional shape of the cylindrical body 11 including the minor axis of the ellipsoidal shape is tapered inward from the side of the diaphragm 12 toward the open end 11a, as shown in FIG. 2C.

The diaphragm 12 is formed between the cylindrical body 11 and the rigid boss 13 in order for the portion of the cylindrical body 11 on the open end 11a side to be capable of being deformed into an ellipsoidal shape. When the portion including the open end 11a of the cylindrical body 11 is deformed into an ellipsoidal shape, the diaphragm 12 is bent backwards as shown by an arrow in FIG. 2B at a joint portion thereof joining to the rigid boss 13 in the longitudinal cross section including the major axis of the ellipsoidal shape. Whereas, the diaphragm 12 is bent forward toward the side of the open end 11a as shown by the arrow in FIG. 2C in the longitudinal cross section including the minor axis of the ellipsoidal shape. Thus, during the operation of the gearing 1, the diaphragm 12 is applied with bending stress in the direction of the center axis line 11b and, at the same time, is applied with share stress caused by torque transmission.

Taking into consideration of these stresses applied in combination to the diaphragm 12, the longitudinal cross sectional shape of the diaphragm 12 is designed so that the open-end side portion of the cylindrical body 11 is capable of being deformed into an ellipsoidal shape with a smaller force and that the diaphragm 12 is capable of transferring a larger torque. In particular, the longitudinal cross sectional shape of the diaphragm is designed so as to avoid stress concentration on the diaphragm in a state in which the combined stresses are applied.

Patent document 1 (Japanese Unexamined Utility Model Application Publication No. 61-173851) discloses a cup-shaped flexible externally toothed gear, in which the longitudinal cross sectional shape of a diaphragm is designed so that the inside end face thereof is defined by a straight line, and the outside end face thereof in the joint portion to the boss is defined by a streamline so as to gradually increase the thickness of the diaphragm.

Patent document 2 (WO 2013/024511) discloses a flexible externally toothed gear, in which the diaphragm as a whole is made slightly inclined with respect to a direction perpendicular to the center axis line, and the outside profile of the joint portion to the boss in the diaphragm is defined by three circular arcs.

The streamline, which is superior in dynamic characteristics, is employed to define the profile of the boss-side joint portion in the diaphragm of the cup-shaped flexible externally toothed gear. The streamline profile is constituted by three or more circular curves having different radii as disclosed in Patent Document 1. The circular curves are arranged so that the radii thereof become smaller toward the boss side.

The flexible externally toothed gear is usually manufactured by lathe turning. When small-size flexible externally toothed gears are concerned, the radii of the curves for constituting the streamline become smaller inevitably. It is therefore difficult to generate a profile shape of the boss-side joint portion in the diaphragm according to the streamline by making use of lathe turning.

Specifically, in commercially available typical lathe turning machines, the minimum value of the nose tip radius is 0.2 mm or larger. It is difficult to generate a profile shape of the boss-side joint portion of the diaphragm in case in which a streamline defined by circular curves including one having a radius smaller than 0.2 mm is employed. For example, when the flexible externally toothed gear is small in size and has a pitch circle diameter of 20 to 40 mm, if the profile shape of the boss-side joint portion in the diaphragm is defined by a streamline, curves that constitute the streamline include curves having a radius smaller than the minimum value of the nose tip radius of lathe turning machines.

Here, as shown in FIG. 3, it is considered to define the profile shape of the outside end face of the boss-side joint portion 42a in the diaphragm 42 by a circular arc 54 in place of the stream line, the circular arc 54 having a radius R3 that is the same as the minimum nose tip radius and is able to be processed by a commercially available lathe turning machine.

However, in the diaphragm 42 having the profile shape defined by the circular arc, the boss-side joint portion 42a may suffer from stress concentration that is greater than when the streamline profile is employed. This causes to decrease fatigue strength of the flexible externally toothed gear 40, and load capacity of the strain wave gearing cannot be enhanced.

SUMMARY OF INVENTION

In view of the above, an object of the present invention is to realize a profile shape of a diaphragm of a flexible externally toothed gear suited for use in a cup-shaped flexible externally toothed gear which is so small in size that it is difficult to generate a profile shape of streamline by lathe turning.

Another object of the present invention is to realize a strain wave gearing provided with a cup-shaped flexible externally toothed gear having a novel profile shape.

In order to realize the above and other objects, according to one aspect of the present invention, there is provided a cup-shaped externally toothed gear for use in a cup-type strain wave gearing, in which the externally toothed gear is deformed by a wave generator into an ellipsoidal shape and is partially mesh with a rigid internally toothed gear. The cup-shaped externally toothed gear includes a flexible cylindrical body having a first end and a second end in a direction of a center axis line, a diaphragm extending radially inward from the first end of the cylindrical body, a rigid boss formed integrally in a center portion of the diaphragm, and external teeth formed on an outer peripheral surface portion of the second end of the cylindrical body. In the cup-shaped externally toothed gear, when cut along a plane including the center axis line, an inside end face profile of the rigid boss and the diaphragm is defined by an inside straight line perpendicular to the center axis line, and an outside end face profile of the diaphragm is defined by a first concave circular arc having a first radius, a second concave circular arc having a second radius, and an inclined straight line. The first concave circular arc is smoothly connected at one end thereof to a parallel straight line parallel to the center axis line and defines an outer peripheral surface of the rigid boss, the second concave circular arc is smoothly connected at one end thereof to the other end of the first concave circular arc, the inclined straight line is smoothly connected to the other end of the second concave circular arc and is inclined toward the inside straight line, the second radius of the second concave circular arc is larger than the first radius of the first concave circular arc, and a thickness of the diaphragm is gradually decreased from a side of the rigid boss to a side of the cylindrical body.

The inside end face profile of the diaphragm is defined by the straight line perpendicular to the center axis line, the outside end face profile is defined by the first and second concave circular arcs and the inclined straight line. According to experiments conducted by the present inventors et. al, it was confirmed that stress concentration on a boss-side joint portion of the diaphragm can be relieved, and fatigue strength of the flexible externally toothed gear can be enhanced to the same extent as a case where the streamline is employed.

The flexible externally toothed gear according to the embodiment of the present invention is in particular suitable for a small-sized flexible externally toothed gear. Specifically, it is suitable for such a small-sized flexible externally toothed gear that the pitch diameter of external teeth thereof is less than 40 mm and the streamline shape is difficult or unable to be generated by lathe turning. For such a small-sized flexible externally toothed gear, it is preferable that the first radius of the first concave circular arc is equal to or more than 0.2 mm so that lathe turning can be employed.

In another aspect of the present invention, there is provided a cup-type strain wave gearing that has the cup-shaped flexible externally toothed gear as constituted above. According to the embodiment of the present invention, a strain wave gearing having a high load capacity can be realized.

BRIEF DESCRIPTION OF THE DRAWINGS

FIG. 2B is a schematic view cut along a plane perpendicular to the center axis line thereof;

FIGS. 2A, 2B and 2C are respectively explanatory views illustrating longitudinal cross sections of a cup-shaped flexible externally toothed gear;

DESCRIPTION OF THE EMBODIMENTS

An embodiment of a cup-shape flexible externally toothed gear of a cup-type strain wave gearing to which the present invention is applied will be described below, making reference to the accompanying drawings.

Figure 4:
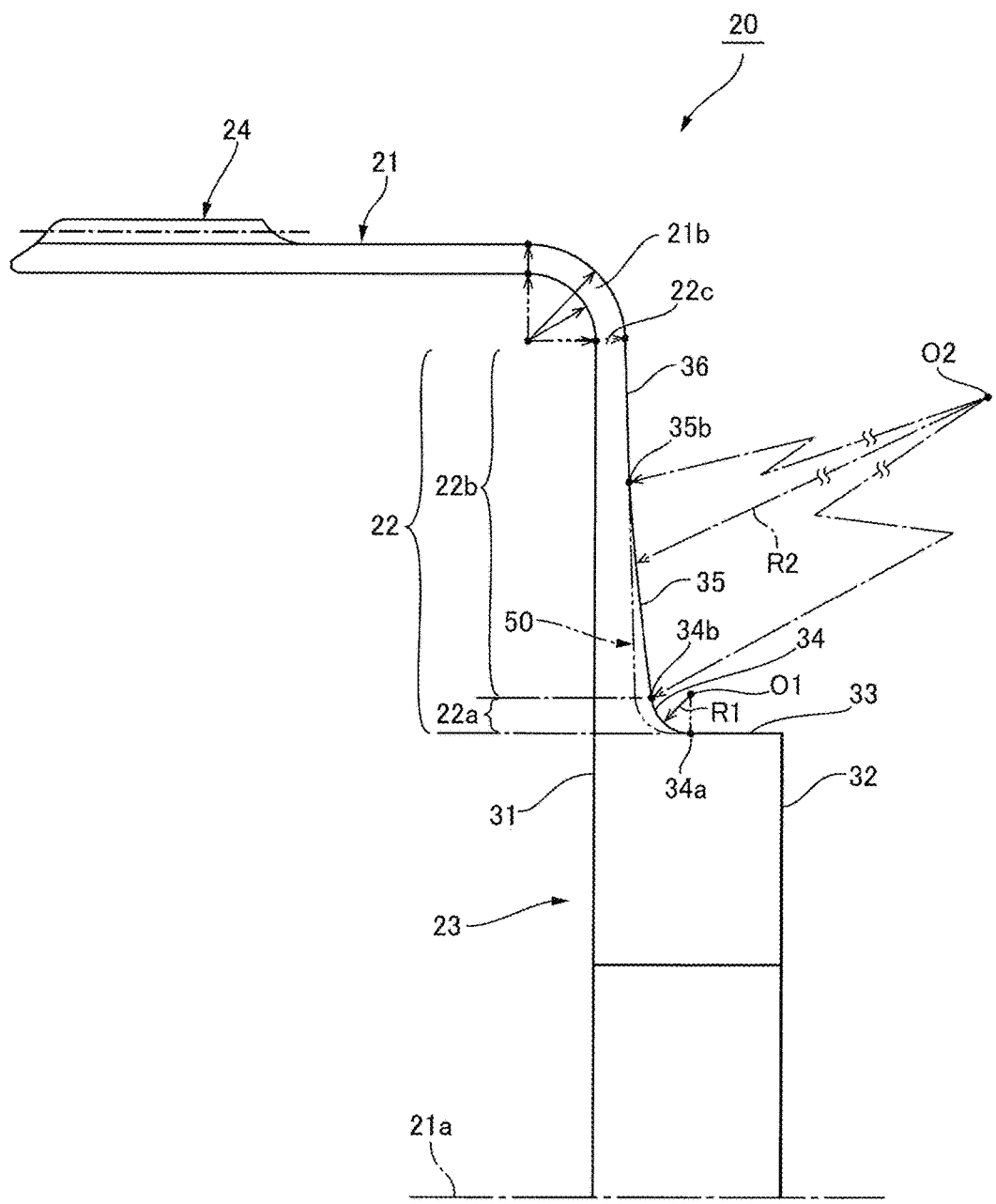
FIG. 4 is a half longitudinal cross sectional view of a cup-shaped flexible externally toothed gear to which the present invention is applied.

FIG. 4 is a longitudinal cross sectional view showing a cup-shaped flexible externally toothed gear of the present embodiment. The flexible externally toothed gear 20 has the same basic configuration as conventional ones (see FIGS. 1A, 1B, and 2A to 2C), and is of a small size in which the pitch circle diameter is about 20 to 40 mm.

The flexible externally toothed gear 20 has a radially flexible cylindrical body 21, a discoid diaphragm 22 extending radially and inward from one end of the cylindrical body 21 in the direction of the center axis line 21a, a ring-shaped rigid boss 23 integrally formed on the center portion of the diaphragm 22 in a concentric manner, and external teeth 24 formed on the outer peripheral surface portion of the other end of the cylindrical body 21.

Cross-sectional profile shapes in the respective portions of the diaphragm 22 will be described. As shown in FIG. 4, when the cup-shaped flexible externally toothed gear 20 is cut along a plane including the center axis line 21a, end faces of the diaphragm 22 and the boss 23 that face the inner side of the cup shape of the gear 20 are called as inside end faces, and opposite end faces thereof that face the outer side of the cup shape are called as outside end faces.

The profiles of the inside end face of the boss 23 and the inside end face of the diaphragm 22 are defined by an inside straight line 31 perpendicular to the center axis line 21a. The profile of the outside end face of the boss 23 is defined by an outside straight line 32 perpendicular to the center axis line 21a. Thus, the boss 23 has a constant-thick ring shape defined by the two straight lines parallel to each other in the present embodiment.

The outside end face profile for the boss-side joint portion 22a of the diaphragm 22 is defined by a first concave circular arc 34 having a first radius R1 centered on point O1. The first concave circular arc 34 has one end 34a smoothly connected to a parallel straight line 33 that is parallel to the center axis line 21a. The parallel straight line 33 defines an outer circumferential profile of the boss 23.

The outside end face profile for the portion 22b of the diaphragm 22 other than the boss-side joint portion 22a, is defined by a second concave circular arc 35 having a second radius R2 centered on point O2 and an inclined straight line 36 smoothly connected to the second concave circular arc 35.

The second concave circular arc 35 is smoothly connected at one end thereof to the end 34b of the first concave circular arc 34. An inclined straight line 36 is smoothly connected to the other end 35b of the second concave circular arc 35. The inclined straight line 36 is slightly inclined toward the inside straight line 31 with respect to the direction perpendicular to the center axis line 21a.

The diaphragm 22 is defined by the inside end face portion formed by the inside straight line 31 and the outside end face portion formed by the first concave circular arc 34, the second concave circular arc 35 and the inclined straight line 36. Therefore, the thickness of the diaphragm 22 is gradually decreased from the side of the boss to the side of the cylindrical body 21.

The second radius R2 of the second concave circular arc 35 is much larger than the first radius R1 of the first concave circular arc 34. The first radius R1 of the first concave circular arc 34 is set to be 0.2 mm, for example, that is the minimum value of the tip nose radius of commercially available typical lathe turning machines.

The outer peripheral edge 22c of the diaphragm 22 is smoothly connected to the inner peripheral edge of an end part 21b of the cylindrical body 21. The end part 21b is curved in a circular-arc shape. For example, the cylindrical body 21 has an approximately constant thickness that is the same as the thickness of the outer peripheral edge 22c of the diaphragm 22.

Figure 1A:
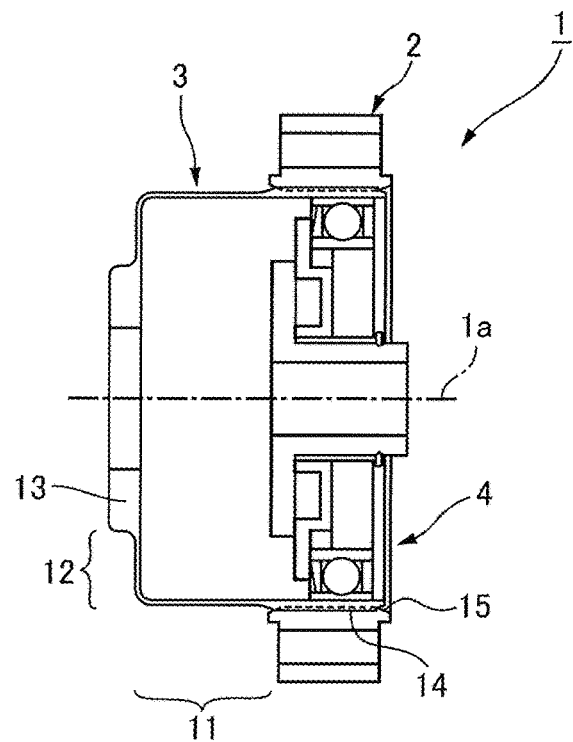
FIG. 1A is a longitudinal cross sectional view of a typical cup-type strain wave gearing.
Figure 1B:
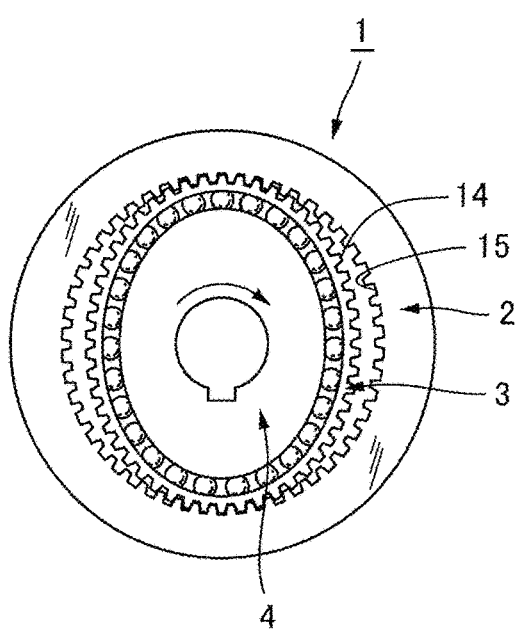
Figure 3:
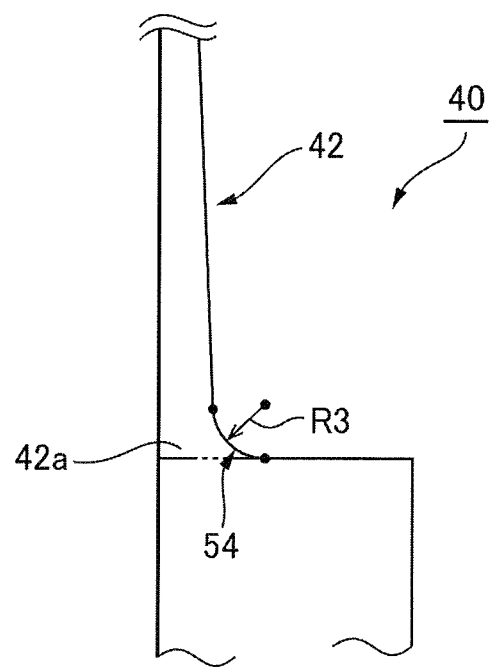
FIG. 3 is an explanatory view showing a reference example of a cross sectional shape of the boss-side joint portion in the diaphragm of a conventional cup-shaped flexible externally toothed gear.

The inventors of the present invention et. al conducted experiments to measure stress distributions during operation in the flexible externally toothed gear 20 of FIG. 4 and the conventional flexible externally toothed gear 40 of FIG. 3. The conventional flexible externally toothed gear 40 has the same configuration as that of the flexible externally toothed gear 20, except that the conventional flexible externally toothed gear 40 has a profile shape portion 50 indicated by an imaginary line shown in FIG. 4.

In FIG. 4, the profile shape portion 50 indicated by the imaginary line is drawn so that, in the conventional flexible externally toothed gear 40, the circular arc 54 thereof (see FIG. 3) is set to be the same as the first concave circular arc 34 and the inclined straight line 36 is extended radially inward so as to be smoothly connect to the end of the arc 34.

Figure 5A:
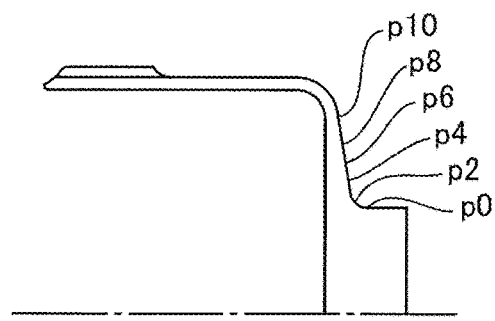
FIG. 5A is an explanatory view showing positions of the diaphragm where stress is measured.
Figure 5B:
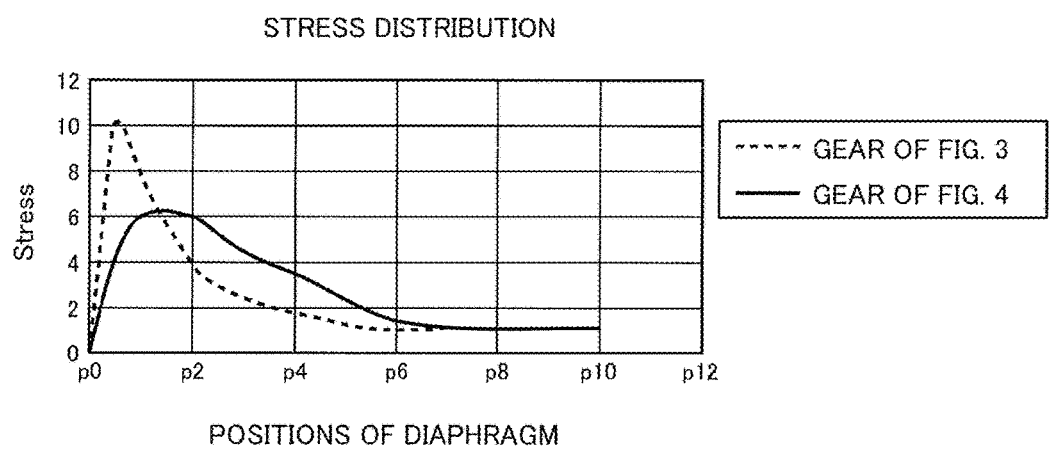
FIG. 5B is a graph showing stress distributions of the flexible externally toothed gears of FIGS. 3 and 4.

FIG. 5A shows positions at which stress is measured, and FIG. 5B is a graph showing obtained stress distributions. In the graph, a solid line is a curve showing the stress distribution obtained from the flexible externally toothed gear 20, while a dotted line is a curve showing the stress distribution obtained from the conventional flexible externally toothed gear 40. The stress measurement point p0 corresponds to the end 34a, the point p2 to the end 34b, the point p6 to the middle position of the second concave circular arc 35, the point p8 to the end 35b of the second concave circular arc 35, and the point p10 to the outer peripheral end 22c of the diaphragm.

As can be seen from the graph, the stress concentration on the boss-side joint portion 22a of the diaphragm 22 is greatly relieved, which shows that the fatigue strength of the externally toothed gear 20 can be increased. The buckling torque of the flexible externally toothed gear 20 is also increased, which is not shown in the drawings.

The cup-shaped flexible externally toothed gear 20 having the above-mentioned structure can be used for the flexible externally toothed gear 3 shown in FIGS. 1 and 2. A cup-type strain wave gearing in which the flexible externally toothed gear 20 is assembled is capable of increasing the lord capacity when compared to a case where the flexible externally toothed gear 40 as shown in FIG. 3 is assembled.

What is claimed is:

1. A cup-shaped externally toothed gear for use in a cup-type strain wave gearing, in which the externally toothed gear is deformed by a wave generator into an ellipsoidal shape and is partially mesh with a rigid internally toothed gear, the cup-shaped externally toothed gear comprising:
a flexible cylindrical body having a first end and a second end in a direction of a center axis line;
a diaphragm extending radially inward from the first end of the cylindrical body;
a rigid boss formed integrally in a center portion of the diaphragm; and
external teeth formed on an outer peripheral surface portion of the second end of the cylindrical body,
wherein
when cut along a plane including the center axis line,
an inside end face profile of the rigid boss and the diaphragm is defined by an inside straight line perpendicular to the center axis line, and
an outside end face profile of the diaphragm is defined by a first concave circular arc having a first radius, a second concave circular arc having a second radius, and an inclined straight line;
wherein
the first concave circular arc is smoothly connected at one end thereof to a parallel straight line parallel to the center axis line and defines an outer peripheral surface of the rigid boss, the second concave circular arc is smoothly connected at one end thereof to the other end of the first concave circular arc, and
the inclined straight line is longer than a minimum thickness of the diaphragm, and is smoothly connected to the other end of the second concave circular arc and is inclined toward the inside straight line, and wherein
the second radius of the second concave circular arc is larger than the first radius of the first concave circular arc, and a thickness of the diaphragm is gradually decreased from a side of the rigid boss to a side of the cylindrical body.

2. A cup-shaped flexible externally toothed gear for use in a cup-type strain wave gearing, in which the externally toothed gear is deformed by a wave generator into an ellipsoidal shape and is partially mesh with a rigid internally toothed gear, the cup-shaped externally toothed gear comprising:
a flexible cylindrical body having a first end and a second end in a direction of a center axis line;
a diaphragm extending radially inward from the first end of the cylindrical body;
a rigid boss formed integrally in a center portion of the diaphragm; and
external teeth formed on an outer peripheral surface portion of the second end of the cylindrical body, wherein
when cut along a plane including the center axis line,
an inside end face profile of the rigid boss and the diaphragm is defined by an inside straight line perpendicular to the center axis line, and
an outside end face profile of the diaphragm is defined by a first concave circular arc having a first radius, a second concave circular arc having a second radius, and an inclined straight line;
wherein
the first concave circular arc is smoothly connected at one end thereof to a parallel straight line parallel to the center axis line and defines an outer peripheral surface of the rigid boss, the second concave circular arc is smoothly connected at one end thereof to the other end of the first concave circular arc, and
the inclined straight line is smoothly connected to the other end of the second concave circular arc and is inclined toward the inside straight line, and wherein the second radius of the second concave circular arc is larger than the first radius of the first concave circular arc, and a thickness of the diaphragm is gradually decreased from a side of the rigid boss to a side of the cylindrical body,
wherein
a maximum value of a pitch circle diameter of the external teeth is 40 mm, and
a minimum value of the first radius of the first concave circular arc is 0.2 mm.

3. A cup-type strain wave gearing comprising the cup-shaped flexible externally toothed gear as set forth in claim 1.

4. The cup-shaped externally toothed gear according to claim 1, wherein the inclined straight line is longer than the second radius of the second concave circular arc.

5. The cup-type strain wave gearing according to claim 3, wherein the inclined straight line is longer than the second radius of the second concave circular arc.

\* \* \* \* \*